United States Patent

Hunsader

[15] 3,693,319
[45] Sept. 26, 1972

[54] WRAPPING INDIVIDUAL SLICES OF FOOD

[72] Inventor: David N. Hunsader, Green Bay, Wis.

[73] Assignee: Swift & Company, Chicago, Ill.

[22] Filed: Dec. 10, 1971

[21] Appl. No.: 206,971

Related U.S. Application Data

[62] Division of Ser. No. 30,700, April 22, 1970.

[52] U.S. Cl. ..................................... 53/123, 53/180
[51] Int. Cl. ............................................ B65b 51/30
[58] Field of Search ....................................... 53/122

[56] References Cited

UNITED STATES PATENTS 2,919,990   1/1960   Podlesak et al. .......... 53/180 X
3,544,340   12/1970  Miller et al. .............. 53/180 X

*Primary Examiner*—Travis S. McGehee
*Attorney*—Edward T. McCabe et al.

[57] ABSTRACT

A method and apparatus for wrapping individual slices of product, such as cheese, in film where the slices are first cut from a continuously produced ribbon and are thence carried upon a web of film that is drawn through enfolding operations to entube the successive slices by successive pairs of jaws. The jaws are evenly spaced on endless conveyor driven at a speed slightly greater than the ribbon of product thus producing spaces between successive slices where the jaws engage the film and where the film is first heat sealed while engaged and then severed immediately before being disengaged and discharged.

6 Claims, 4 Drawing Figures

INVENTOR
DAVID N. HUNSADER

BY E.T. McCabe

INVENTOR
DAVID N. HUNSADER

BY E. T. McCabe

WRAPPING INDIVIDUAL SLICES OF FOOD

This application is a division of my copending application Ser. No. 30,700, filed Apr. 22, 1970.

This invention relates to an improvement in the food packaging arts; and more specifically deals with an improved apparatus for enwrapping individual slices of a food product such as cheese.

The marketing of many food products requires the packaging of a plurality of pre-cut slices for the convenience of the consumer who normally prefers the product in slice form. A typical example is cheese, particularly processed cheese, which is often employed by the consumer in the preparation of sandwiches. However, sliced processed cheese has the undesirable tendency of the slices clinging to one another. When packaged by modern technique where the outer wrapper very tightly embraces a group of slices (and where air is withdrawn from the package) the characteristic is increased almost to the loss of identity of separate slices. Heretofore in an attempt to alleviate this problem, producers of sliced cheese have attempted various solutions including interleaving successive slices with sheets of parchment paper and the like. While these attempts have succeeded to some degree, accurate placement of the interleaves is required, and even then the edges of successive slices may become compressed to the point of joining with one another.

More recently, attempts have been made to individually wrap each successive slice so as to completely enclose all of the product surfaces. This technique is expensive where performed by hand on pre-sliced product and hence there has been a tendency to direct efforts toward the molding of the cheese material within an envelope of wrapping material. However in such a process the hot molten cheese tends to cause delamination of the wrapping material. Also, there presently exists in the cheese industry highly efficient cheese forming machines for producing very large quantities of processed cheese in the form of multiple ribbons having the thickness and width of single slices which are subsequently severed transversely into individual slice lengths; and it is accordingly advantageous to utilize such preformed slices.

Briefly the present method contemplates the cutting of a continuously produced ribbon of product into successive slices which are received upon a continuous web of film that is then folded about the sides and across the top of the slices while being drawn in a given direction and at a speed in excess of that of the ribbon of product. The film is drawn by engaging and propelling same along spaces between successive slices caused by the relatively greater speed of the film; and the film is first sealed and then severed at those spaces while thus engaged. The severing of the film is limited to occur only just prior to disengagement from whence each enwrapped slice is positively discharged in the same given direction.

The apparatus for carrying out the method basically comprises a means for producing a continuous ribbon of product and means for cutting it into equal length segments or slices. A film supply and folding means are positioned to receive successive slices upon a web. The web is drawn in a given direction at a speed greater than that of the ribbon by a plurality of cooperating jaws carried upon spaced endless chains. The jaws engage the film between successive slices and carry means to both heat seal and sever the film; and trip means to actuate the means to sever the film are located near the discharge end of the endless chains.

Accordingly, it is an object of the present invention to provide an improved method and apparatus for automatically and mechanically enwrapping individual preformed slices of food product.

It is another object of the present invention to provide an improved method and apparatus for enwrapping individual successive slices of processed cheese which are cut from ribbons of such cheese.

Further objects and advantages of the present invention will become apparent upon reading the following detailed description in conjunction with the drawings wherein:

FIG. 5 is a partial sectional view, with parts removed for clarity, of the apparatus taken at line 5—5 of FIG. 3.

Figure 1:
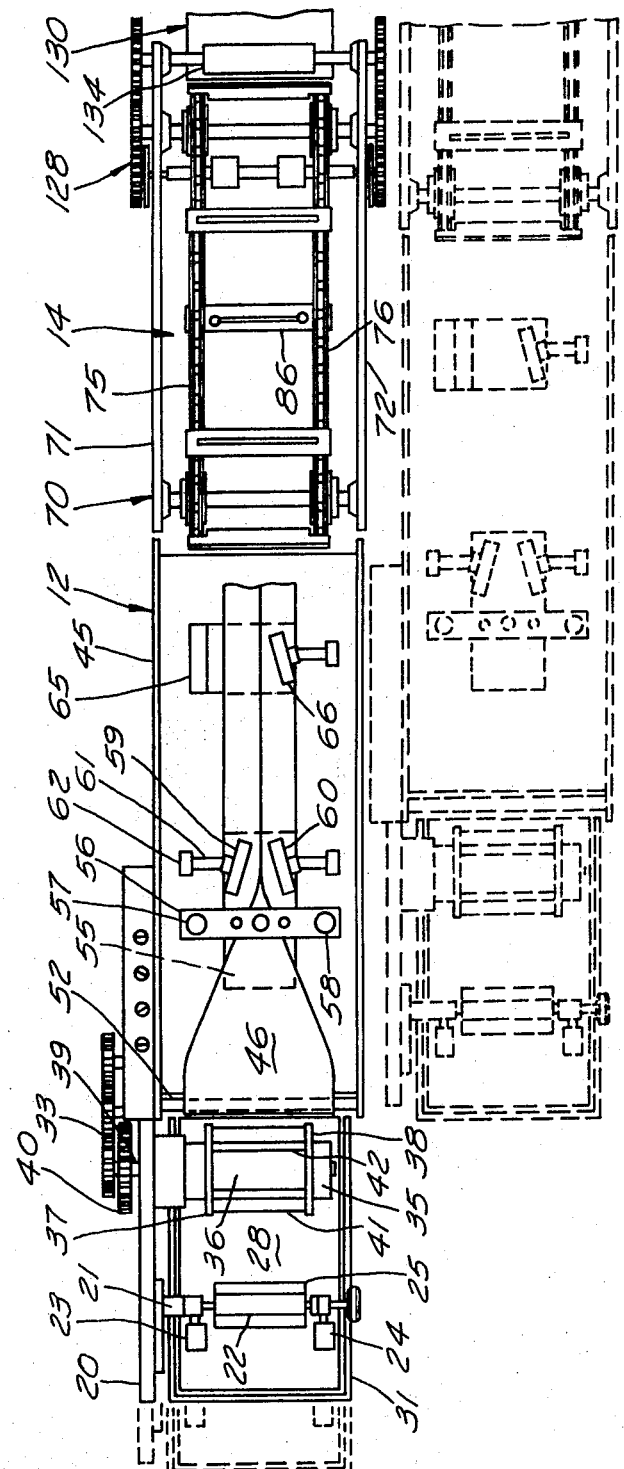
FIG. 1 is a plan view of an embodiment of the present invention.
Figure 2:
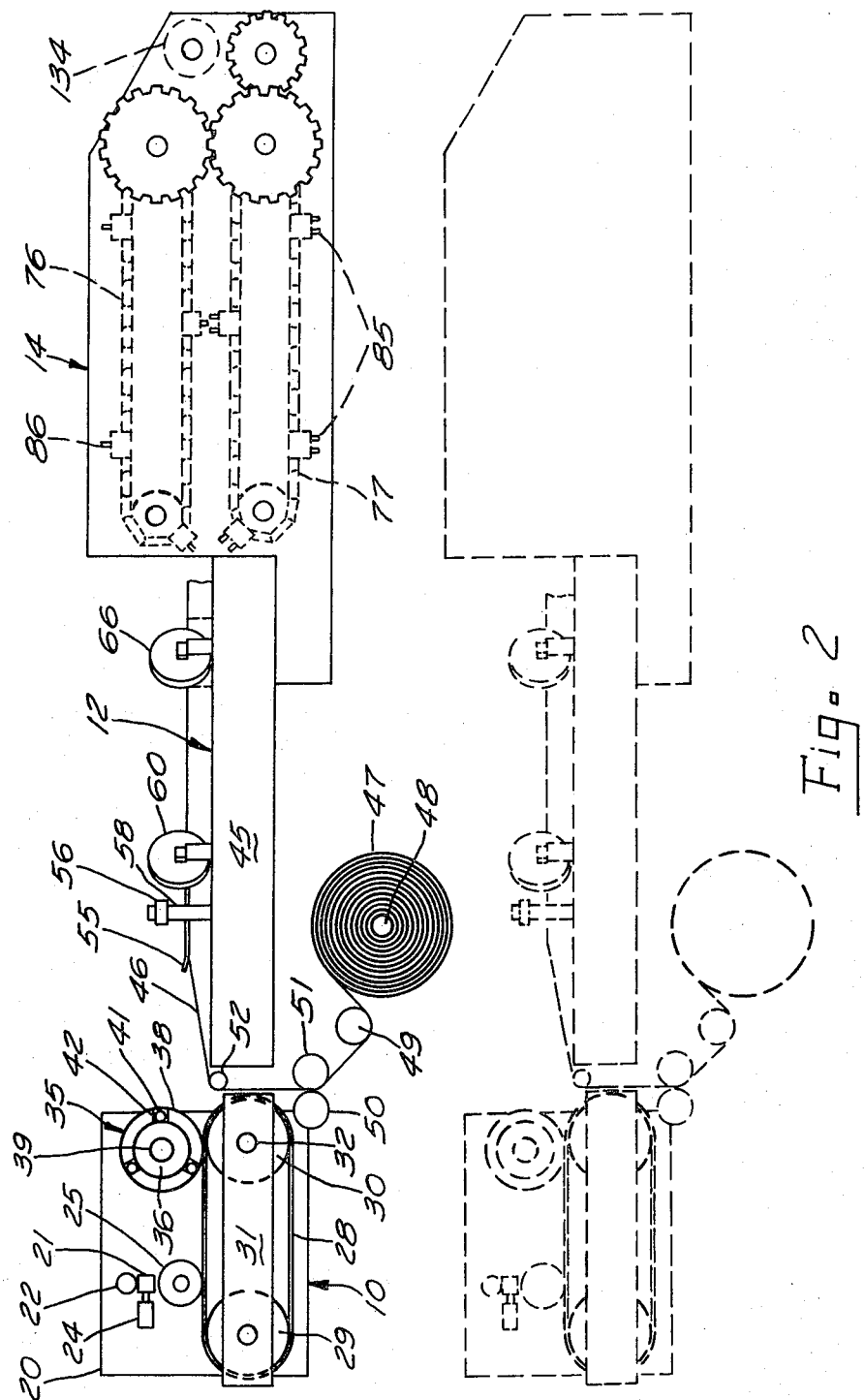
FIG. 2 is a side elevation of the apparatus illustrated in FIG. 1.

The method of the present invention will be made clear with an understanding of the apparatus. In general, the present apparatus comprises three major sections; namely, a cheese ribbon delivery and cutting means generally 10, a film folding means generally 12, and a film sealing, severing, and drawing means generally 14. In operation a plurality of such systems of apparatus are ganged together so as to simultaneously handle a number of ribbons of cheese. Preferably sufficient numbers of apparatus are ganged to simultaneously produce an adequate number of slices to be brought together subsequently in a marketable package of, for instance, one-half pound of product. A total of eight such units has been found to be adequate for this purpose. Similarly, a sufficient number of systems of such apparatus should be ganged together so as to simultaneously utilize all or a major portion of the ribbons of cheese that can be produced by a cheese-forming machine. Such a cheese-forming machine is shown in U.S. Pat. No. 2,352,210. A basic machine available to the industry includes a chilled forming drum from which eight such ribbons of cheese are produced, and hence the ganging of eight packaging units has been advantageous. In the drawings FIGS. 1 and 2 a portion of a preferred arrangement of ganged apparatus is shown by the indication of additional systems in phantom. Preferably the systems of apparatus are staggered both vertically and horizontally two abreast and four high so as to provide maximum access for maintenance and to enable the driving of all systems from a single source of power. Staggering the systems also facilitates the delivery of the various ribbons of cheese. The preferred arrangement also locates the output of each unit in close proximity to the output of all other units so as to facilitate the combining of the slices thus simultaneously produced into unit packages of multiple slices.

Referring to the drawings in greater detail, it will be observed that each unit of each system of apparatus includes the aforementioned cheese ribbon delivery and cutting means generally 10 which comprises a side plate 20 having mounted thereon a cantilever bar 21 that supports a longitudinal major surface roller 22 and two adjacent edge rollers 23, 24 perpendicular to the former. The aforementioned system of rollers provides initial guidance for a ribbon of cheese that is received descending vertically from an overhead production machine.

Beneath the cantilever bar 21 and rotatably mounted from the side plate is a larger diameter turning roller 25 about which the ribbon of cheese is drawn and turned approximately 90° to rest horizontally upon an endless belt 28. Preferably, all of the aforementioned rollers have surfaces of a fluorinated hydrocarbon such as Teflon (a registered Trade Mark) or some other material that provides superior release of the surface of the cheese.

The endless belt 28 is trained about an idler pulley 29 and a drive pulley 30 that are journaled within a box frame 31. The drive pulley 30 is fixed to a shaft 32 that extends through the side plate 20 to a drive gear 33 that is in turn connected to a power source, not shown. The endless belt is driven at substantially the same speed at which the ribbon of cheese is produced.

The ribbon of cheese after being arranged horizontally is segmented into individual slices by a rotatable harp generally 35. The harp 35 is mounted above the endless belt 28 and comprises a drum 36 having two-spaced flanges 37, 38 aligned so as to overspace the cheese ribbon. The drum 36 is mounted upon a shaft 39 that is journaled in the side plate 20 and extends therethrough to a gear 40 train suitably selected to drive the periphery of harp 35 at a speed equal to the ribbon of cheese. The periphery of the harp, driven at such speed, includes a plurality of wires 41 strung between the flanges 37, 38 which will thus cut through the cheese ribbon. Preferably the wires are attached to spring-loaded radial segments 42 of the drum and flanges 37, 38 which allow inward displacement of the wires if subjected to undue pressures.

Immediately beyond the terminus of endless belt 28 and the rotatable harp 35 is a table generally 45 across which a web of film 46 is drawn. The film is supplied from a continuous roll 47 rotatably mounted on a spindle 48 just beneath the table generally 45 near the short space between the latter and the endless belt 28. A tension roller 49 and a pair of splicing rollers 50, 51 are mounted beneath the table 45 to take up slack and align the film with an end of the table (and also to allow automatic splicing of the wrapping material) where it is pulled across a preliminary forming roller 52.

As the web of film is turned about the preliminary forming roller 52 and drawn upon the upper surface of table 45, it will receive the successive slices cut from the ribbon of cheese by the rotatable harp 35. Preferably the film is drawn forwardly at a speed slightly greater than the speed of the cheese ribbon so as to space each successive slice one from the other. The manner in which the web of film is thus pulled will be subsequently explained.

As the cheese slices are drawn forwardly upon the web of film 46, the latter is folded about the sides and upper surface of each slice so as to enwrap same. This is accomplished by means of a center plow 55 that is suspended from a bridge 56 mounted on a pair of pillars 57, 58 extending upwardly from the upper surface of table 45. Initially, the web of film must be started by hand and folded over the center plow 55 to lap the edges of the film to form a tube. The edges of film are fed between the bridge 56 and plow 55 and thence beneath a pair of tracking wheels 59, 60, which are toed inwardly so as to draw the edges of film into overlapping arrangement. Each tracking wheel is mounted upon an arm 61. The outer ends of each arm 61 are, in turn, mounted to a hinge 62 fastened onto the table 45. A short distance beyond the center plow 55 and tracking wheels 59, 60, is located a side plow 65 and cooperating tracking wheel 66 which are effective to tighten the film about each slice. The side plow 65 is comprised of a metal blade that overlies the table 45 from one side thereof; and the tracking wheel 66 is hingedly mounted from the opposite side of the table 45. One edge of the film from said opposite side of web 46 is fed between the side plow 65 and tracking wheel 66; and the toed posture of the latter will effectively cause the film to be drawn more tightly across the slices passing beneath the plow.

Figure 3:
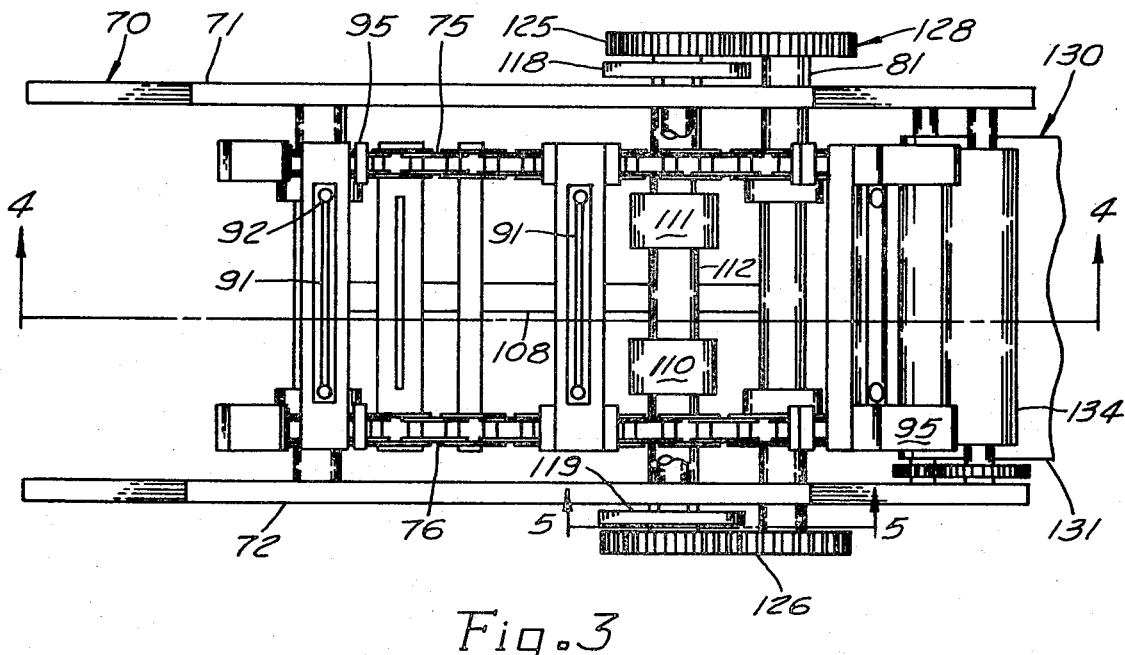
FIG. 3 is an enlarged plan view in greater detail of a portion of the apparatus shown in FIGS. 1 and 2.
Figure 4:
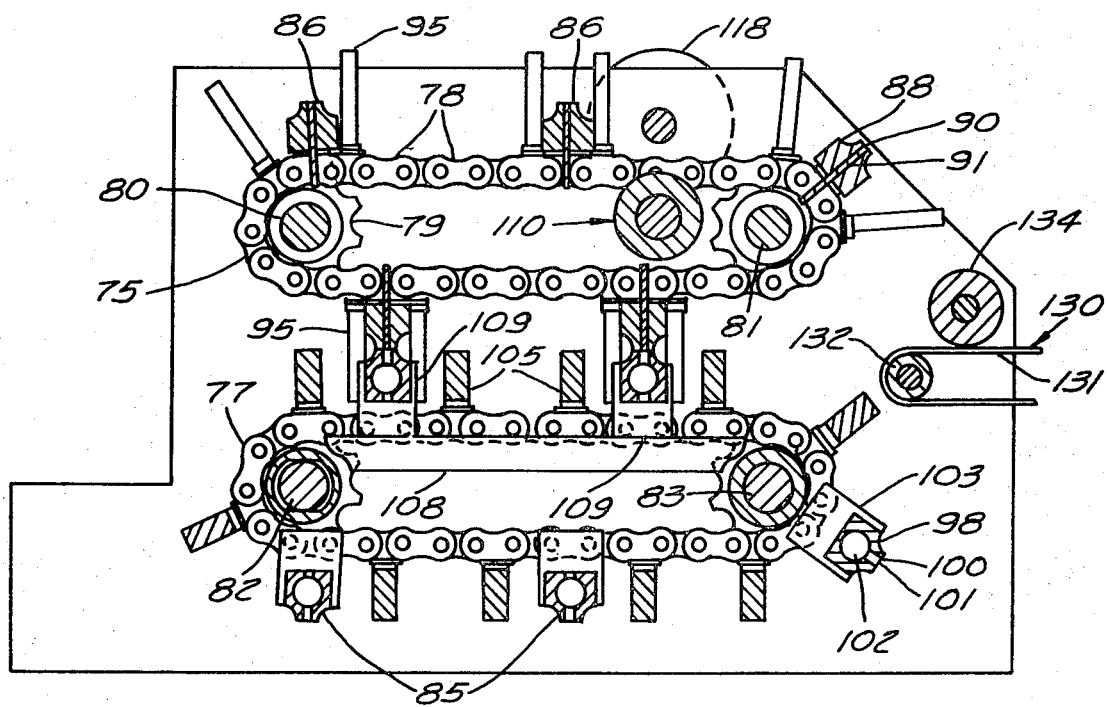
FIG. 4 is a side elevation in section of the apparatus shown in FIG. 3 taken at line 4—4 therein.

The web of film 46 is drawn across the table 45 as above described by the sealing, severing, and drawing means generally 14. The latter, as best seen in FIGS. 3 and 4, is structured within a frame generally 70 having side plates 71 and 72. A pair of upper endless chains 75, 76, endless chains 77, each comprised of a plurality of links 78 are mounted on sprockets 79 between the side plates 71, 72. Sprockets for the upper chains 75, 76 are mounted on a pair of shafts 80, 81 positioned to locate the lower run of the upper chains slightly above the level of table 45. Similarly, the sprockets for the lower endless chain 77 are mounted on shafts 82, 83 positioned so as to locate the upper run of these chains at a level slightly below that of table 45.

A plurality of lower jaw members 85 are carried, transversely, between the lower chains 77; and similarly an equal plurality of upper jaws 86 are carried transversely between the upper endless chain 75, 76. The jaws and chains are so arranged as to bring respective pairs of upper and lower jaws 85, 86 together at a level even with the table 45 when carried through opposing runs of the upper and lower chains. Each upper jaw 86 comprises a bar 88 of metal or the like having a transverse face 90 of reduced width which is slotted to receive a reciprocable blade 91. The ends of each blade 91 are fastened to spring retainers 92 mounted to reciprocate in the bar 88 and to bias the blade to an inoperative position. Each bar 88 is fastened to a single link 78 in each of the upper endless chains 75, 76. Connected adjacent each upper jaw bar 88 at each side and on each of the chains 75, 76 are guide bars 95. The latter are manufactured from flat stock and are connected between adjacent links so as to be pivotable separately from each respective jaw 86. The function of guide rods 95 is to accurately align and stabilize the pairs of jaws 85, 86 as will subsequently be made clearer.

Each lower jaw 85 comprises a bar 98 which has a contact face 100 of reduced width to match the face 90 of the upper jaw 86. Each lower jaw 85 also contains a slot 101 to receive a cooperating blade 91 when extended from the upper jaw 86 against the normal bias of spring retainers 92. Preferably each lower jaw also contains a heating element such as an electric filament 102 which will be subsequently further explained.

It is preferable to construct the lower jaws 85 to be of substantially the same width as the upper jaws 86 so as to be closely embraced at the sides thereof by the guide bars 95 from adjacent the upper jaws 86 when the jaws are mated. The number of upper and lower jaws are equal and each are evenly spaced on the pairs of endless chains so as to be cooperatively aligned with one another when carried through opposing runs of the upper and lower chains. As the jaws pass about the respective sprockets 79 so as to come together, the guide bars 95 extending independently from the upper endless chains 75, 76 will closely embrace both upper and lower jaws 85, 86 so as to assist the alignment of same. At the same time the jaws will compress therebetween the tube of film 46 previously folded about the individual cheese slices. Since all guide bars 95 are mounted directly to the upper chains 75, 76 the enfolded film 46 must be confined to the area between the chains and within the path of the jaws.

Successive lower jaws 85 and upper jaws 86 are spaced on their respective chains distances equal to the spacing of slices so that, when the film is properly started by hand, the jaws will engage the film only at the areas between successive slices.

Positioned on each lower chain 77 between the lower jaws 85 are a plurality of crossrails 105 which serve to support the weight of each slice and film spanning the distance between successive jaws. The crossrails 105 thus minimize or eliminate displacement of the film due to package sag.

An electrical bus bar 108 is located between the lower endless chains 77 at a level just beneath the upper run thereof so as to be in sliding contact with an electrical brush 109 carried by each lower jaw 85 and connected with the filament 102 therein. The lower jaws 85 are grounded, electrically, through the endless chains 77 and associated sprockets, shafts, etc. An electrical path to a source of electric energy (not shown) is completed during a portion of the travel of each jaw above the bus bar 108. Thus when cooperating pairs of upper and lower jaws 85, 86 are engaged with the film 46, the lower jaw 85 will become heated by means of an electric current passing through the filament 102. Hence the film material gripped between the jaws will be heat sealed. While this occurs, the cooperating jaws also pull the entire web of film 46 forwardly (to the right in the figures).

During the forward movement of the jaws the blades 91 in the upper jaws 86 will be held in an inoperative position by the spring retainers 92 and will not initially contact the film. However, as the upper jaws 86 are advanced toward the terminus of endless chains 75, 76 each blade 91 will successively be depressed as each jaw passes beneath a trip roller generally 110 mounted between the sides 71, 72 of frame generally 70. The latter roller 110 comprises a pair of annular cushions 111 encircling a shaft 112 each end of which is mounted in pillow bearings 113, or the like, that are confined within vertical slots 114 (shown in FIG. 5) in the respective sides 71, 72 and biased upwardly by springs 115 or the like toward an upper inoperative position.

Normally the shaft 112 is urged to a downward position by means of cams 118, 119 located outwardly of each side 71, 72 so that each blade 91 will be positively forced downwardly through each respective upper jaw 86 into the slots 101 of the cooperating lower jaw 85 upon engaging the annual contact cushions 111. Thus it is ensured that film 46 will be severed before being released from the jaws 85, 86. However, to reduce sidewise pressures on the blades 91 as they are carried to the cutting location two brief portions 120, 121 of each cam surface (cams 118, 119) are relieved so as to permit upward movement of the shaft 112 as each blade 91 first moves into position and then is removed from position directly beneath the center of the shaft 112. A high point between the relieved portions on each cam 118, 119 drives the shaft 112 downwardly precisely at the movement that the blade 91 is directly there beneath. This is accomplished by driving each cam 118, 119 to rotate one full turn during the time required for the endless conveyors 75, 76 and 77 to advance one package length (the distance between successive jaws). Also, preferably the cam is driven to rotate in a direction opposite to the shafts 80, 81, of the upper endless conveyors so as to turn the shaft 112 in the same direction as shafts 80, 81 and hence continuously move the annular contact cushion 111 in the same direction as each blade 91 is moving. Each cam 118, 119 is driven independently by gears 125, 126 which, in turn, are driven by a gear train generally 128 that is also connected to power shafts 81 and 83 of the endless conveyors. The endless conveyors are driven at a speed equal to or slightly in excess of the speed of the ribbon of cheese. Since the web of film 46 will be pulled forwardly at this speed, the spacing of the cheese slices thereon will depend on the excess of conveyor speed over that of the cheese ribbon. However, a slight additional impetus is given to the web of film intermittently as each pair of cooperating jaws comes together to pull the film around the forward edge of a slice. The latter impetus will be translated into a small additional increment of space between successive slices received on the web 46 at the preliminary forming roller 52.

Preferably the size of the gears 125, 126 in relation to the periphery of cams 118 and 119 and the respective circumferences of shaft 112 and the contact cushions 111 are interrelated so as to produce a surface speed at the annular cushions 111 substantially equal to the lineal speed of the endless chains. It is also desirable that the gear train generally 128 include a planetary drive system (not shown) that will permit and enable, in ways known to those skilled in the mechanical arts, periodic adjustment of the speed of the endless conveyors so as to accommodate for irregularities in production rate and maintain registry of the jaws with spaces between cheese slices. Coordination of the planetary gear speed adjustment may be provided in a known manner by photoelectric sensing means (not shown) placed to detect the presence of spaces in the enfolded film 46 between successive cheese slices.

At the discharge end of the sealing, severing, and drawing means generally 14 is a takeoff conveyor generally 130 comprising a belt 131 trained about a pulley 132 that is journaled in the sides 71, 72 of the frame generally 70 at a position closely adjacent the conveyor drive shafts 81, 83. A relatively large diameter discharge roller 134 is positioned above the endless belt 131 and in engagement with the upper run thereof along an area close to the pulley 132 so as to positively grip wrapped cheese slices therebetween and extract same from between the endless chains 75, 76 and 77. Preferably the imaginary line of contact between the discharge roller 134 and belt 131 is located a distance from the point at which the upper and lower jaws 86, 85 separate, that is less than the length of a cheese slice so that each successive slice will be positively fed thereto. The speed of the endless belt 131 should be greater than the speed of the endless chains 75, 76 and 77 so as to clear product from the latter.

Obviously many modifications and variations of the invention as hereinbefore set forth may be made without departing from the spirit and scope thereof, and, therefore, only such limitations should be imposed as are indicated in the appended claims.

I claim:

1. An improved apparatus for enwrapping successive single slices of cheese in film, said apparatus comprising: means for producing a single continuous ribbon of cheese at a constant speed; cutting means for segmenting said ribbon of cheese into successive individual slices of a selected equal length; continuous film supply means positioned to present a web of film beneath said successive slices; film folding means to enwrap said web about the sides and across the top of said slices; a plurality of spaced endless chains beyond said film folding means said chains having runs trained parallel with said web of film and space above and below said web; a plurality of cooperating pairs of upper and lower jaws carried upon said chain, said jaws having narrow contacting faces to grip opposite portions of said web wrapped about said slices, the faces of said jaws being spaced on each of said chains a distance substantially equal to the length of said selected equal length of said slices whereby to receive said slices within said film between successive pairs of jaws; drive means connected to said chains to drive same at a rate at least slightly greater than said speed of the cheese ribbon whereby to separate said slices received upon said web by a distance at least equal to said jaw faces; reciprocable knife blades carried within slots in each of said upper jaws; coincident slots in each of said lower jaws to receive said knife blades when extended from the upper jaws; heater elements carried in each lower jaw to heat seal the film between successive slices; trip means for extending said blades from said upper jaws into said lower jaws successively as each pair of jaws reaches the downstream end of the runs of said chains whereby to sever said web centrally between slices just before being released from said jaws; and discharge means spaced beyond said chains a distance less than said lengths to extract each wrapped slice from said jaws.

2. The apparatus of claim 1 wherein guide members are secured to said endless chains closely adjacent the front and back sides of each upper jaw, and wherein the cooperating lower jaw of said pair is of a configuration to closely receive said guides whereby to accurately align and stabilize said pairs of jaws when brought together about said film.

3. The apparatus of claim 1 wherein support members are positioned upon said endless chains between successive lower jaws whereby to prevent excessive sag in each enwrapped slice.

4. The apparatus of claim 1 including an electrical bus bar beneath the lower chain for energizing said heater elements in said lower jaws during the portion of travel when in contact with said film.

5. The apparatus of claim 1 wherein said knife blades are positively reciprocated to sever film between jaws by means of a trip roller that is urged into contact with the blade only when the blade is directly beneath the roller.

6. The apparatus of claim 5 wherein the roller is movable vertically and rotated by a cam, the rotation being such as to move the surface of the roller in the same direction as the blade is moved.

* * * * *